US005675780A

United States Patent [19]

Plant-Mason et al.

[11] Patent Number: 5,675,780

[45] Date of Patent: Oct. 7, 1997

[54] METHOD AND APPARATUS FOR STORING DATA IN DATABASE FORM TO A COMPACT DISC USING A SCRIPT FILE TO DESCRIBE THE INPUT FORMAT OF DATA

[75] Inventors: William E. Plant-Mason, Templeton; David Nguyen, Fountain Valley, both of Calif.

[73] Assignee: CD-Comm Systems, Inc., Indianapolis, Ind.

[21] Appl. No.: 664,376

[22] Filed: Jun. 14, 1996

Related U.S. Application Data

[63] Continuation of Ser. No. 463,701, Jun. 5, 1995, abandoned, which is a continuation of Ser. No. 72,066, Jun. 1, 1993, abandoned.

[51] Int. Cl.$^6$ ........ G06F 17/30

[52] U.S. Cl. ........ 395/606

[58] Field of Search ........ 395/606

[56] References Cited

U.S. PATENT DOCUMENTS

| | | | |
|---|---|---|---|
| 4,775,969 | 10/1988 | Osterlund | 369/53 |
| 4,791,623 | 12/1988 | Deiotte | 369/59 |
| 4,803,643 | 2/1989 | Hickey | 395/147 |
| 4,941,125 | 7/1990 | Boyne | 395/600 |
| 4,947,367 | 8/1990 | Chang et al. | 395/500 |
| 4,953,122 | 8/1990 | Williams | 395/400 |
| 4,964,039 | 10/1990 | Izawa et al. | 395/425 |
| 4,965,763 | 10/1990 | Zamora | 364/419.19 |
| 4,974,197 | 11/1990 | Blount et al. | 364/900 |
| 5,034,914 | 7/1991 | Osterlund | 395/200 |
| 5,173,853 | 12/1992 | Kelly et al. | 364/419.1 |
| 5,212,770 | 5/1993 | Smith et al. | 395/155 |
| 5,315,504 | 5/1994 | Lemble | 364/400 |
| 5,347,564 | 9/1994 | Davis et al. | 379/12 |
| 5,490,276 | 2/1996 | Doli, Jr. et al. | 395/709 |

OTHER PUBLICATIONS

Elmasri et al, Fundamentals of Database Systems, Benjamin/Cummings Publishing Co, Inc., 1989.

"Everything you could want in CD-ROM Software", product description from CD-ROM, Inc., Fall 1992.

(List continued on next page.)

*Primary Examiner*—Wayne Amsbury
*Attorney, Agent, or Firm*—Woodard, Emhardt, Naughton, Moriarty & McNett

[57] ABSTRACT

A method and apparatus for rapidly storing input data in database form to a compact disc is provided. In one preferred embodiment, input data is provided to a computer via an input device, such as a 9-track tape or a disk drive. A script file descriptive of the characteristics of the input data is generated by a computer operator. A compact disc application development system (CADS) program processes the script file to create applications, indices and databases in accordance with commands from the script file. Undesired duplicative data may be discarded from the input data in accordance with commands from the script file. Additionally, data may be compressed using data compression techniques. The compressed or uncompressed data is then written to the previously created databases and indices. The application programs and related indices are designed to permit multiple field searches of all indexed fixed field data. The retrieval and applications programs created by the CADS program are designed to retrieve data records in the form of single page reports having some fixed field data common to all original pages of a multiple page report and additionally having scrollable detail or information lines. The database, applications programs and indices are all premastered using premastering software to convert it to a form suitable for storage on the compact disc. The premastered data is then written to a compact disc.

26 Claims, 10 Drawing Sheets

Microfiche Appendix Included
(4 Microfiche, 294 Pages)

OTHER PUBLICATIONS

Nexis Articles: "CD–ROM Development Systems: A Tutorial," Timothy H. Hinds, pp. 1–12, vol. 3 No. 6, Nov. 1990.

"When Rivals Merge—Strategy or Survival," Mary Ann O'Connor, pp. 13–17, vol. 5; No. 5, Sep. 1992.

"Making Optical Disks Without Breaking the Bank", edited by Evan Schwartz, Jul. 16, 1990 Industrial Technology Edition, Business Week, p. 18.

"CD–ROM Power: Knowledge in Hand," Paul Bonner, pp. 19–20 vol. 3; No. 2 Feb. 1990.

"Integrated CD–ROM Databases: The Ideal Solution for Small and Medium Size", Nicholas Lister Moore, p. 21, vol. 3, No. 1, Jan. 1990.

Figure 7:
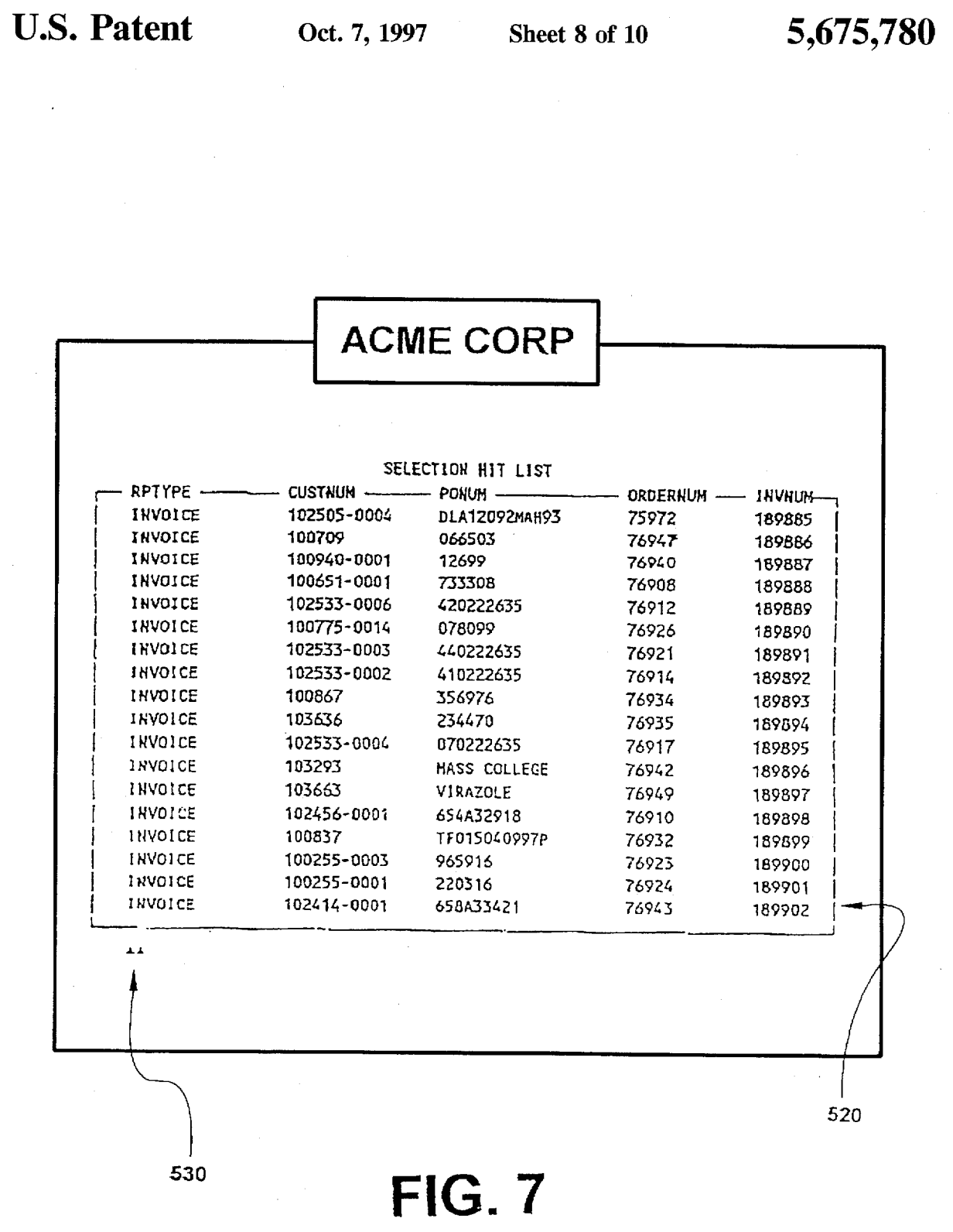

ACME CORP

SELECTION HIT LIST

| RPTYPE | CUSTNUM | PONUM | ORDERNUM | INVNUM |
|---|---|---|---|---|
| INVOICE | 102505-0004 | DLA12092MAH93 | 75972 | 189885 |
| INVOICE | 100709 | 066503 | 76947 | 189886 |
| INVOICE | 100940-0001 | 12699 | 76940 | 189887 |
| INVOICE | 100651-0001 | 733308 | 76908 | 189888 |
| INVOICE | 102533-0006 | 420222635 | 76912 | 189889 |
| INVOICE | 100775-0014 | 078099 | 76926 | 189890 |
| INVOICE | 102533-0003 | 440222635 | 76921 | 189891 |
| INVOICE | 102533-0002 | 410222635 | 76914 | 189892 |
| INVOICE | 100867 | 356976 | 76934 | 189893 |
| INVOICE | 103636 | 234470 | 76935 | 189894 |
| INVOICE | 102533-0004 | 070222635 | 76917 | 189895 |
| INVOICE | 103293 | MASS COLLEGE | 76942 | 189896 |
| INVOICE | 103663 | VIRAZOLE | 76949 | 189897 |
| INVOICE | 102456-0001 | 654A32918 | 76910 | 189898 |
| INVOICE | 100837 | TF015040997P | 76932 | 189899 |
| INVOICE | 100255-0003 | 965916 | 76923 | 189900 |
| INVOICE | 100255-0001 | 220316 | 76924 | 189901 |
| INVOICE | 102414-0001 | 658A33421 | 76943 | 189902 |

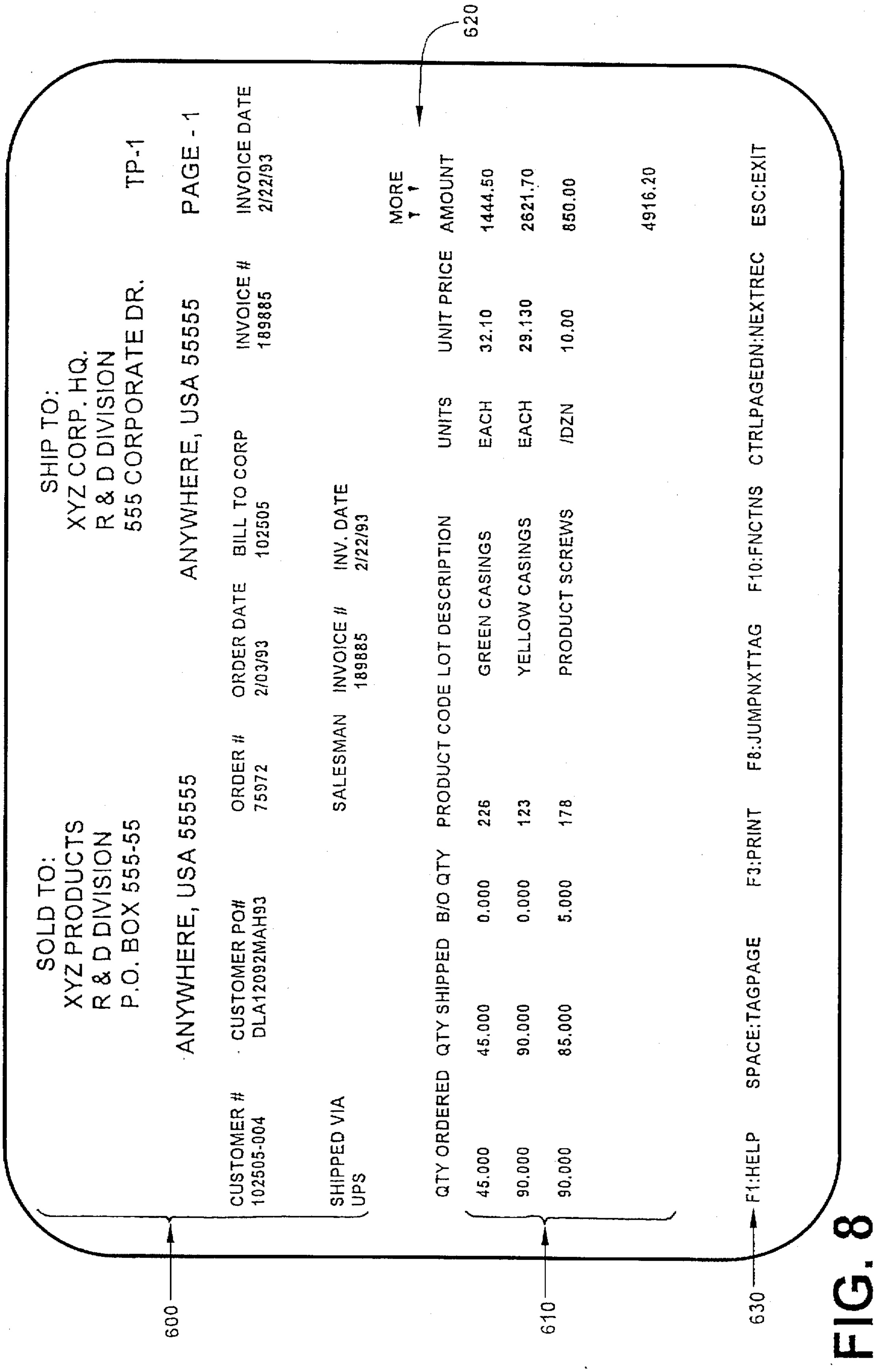

FIG. 8

```
                SOLD TO:                          SHIP TO:
            XYZ PRODUCTS                       XYZ CORP. HQ.
           R & D DIVISION                      R & D DIVISION
           P.O. BOX 555-55                   555 CORPORATE DR.              TP-1

          ANYWHERE, USA 55555               ANYWHERE, USA 55555           PAGE - 1

CUSTOMER #    CUSTOMER PO#      ORDER #    ORDER DATE   BILL TO CORP    INVOICE #    INVOICE DATE
102505-004    DLA12092MAH93     75972      2/03/93      102505           189885       2/22/93

SHIPPED VIA                     SALESMAN   INVOICE #    INV. DATE
UPS                                        189885       2/22/93
                                                                                      MORE ↑↓
QTY ORDERED  QTY SHIPPED  B/O QTY  PRODUCT CODE LOT DESCRIPTION   UNITS   UNIT PRICE   AMOUNT

45.000       45.000       0.000    226           GREEN CASINGS    EACH    32.10        1444.50
90.000       90.000       0.000    123           YELLOW CASINGS   EACH    29.130       2621.70
90.000       85.000       5.000    178           PRODUCT SCREWS   /DZN    10.00        850.00

                                                                                       4916.20

F1:HELP    SPACE:TAGPAGE    F3:PRINT    F8:JUMPNXTTAG    F10:FNCTNS    CTRLPAGEDN:NEXTREC    ESC:EXIT
```

600 — (SOLD TO / header area)
620 — (MORE indicator)
610 — (line items)
630 — (function key bar)

METHOD AND APPARATUS FOR STORING DATA IN DATABASE FORM TO A COMPACT DISC USING A SCRIPT FILE TO DESCRIBE THE INPUT FORMAT OF DATA

This application is a continuation, of application Ser. No. 08//463,701, filed Jun. 5, 1995, now abandoned which is a continuation, of application Ser. No. 08/072,066, filed Jun. 1, 1993, now abandoned.

This application additionally includes a microfiche appendix comprising 4 sheets of microfiche having a total number of 294 frames.

BACKGROUND OF THE INVENTION

This invention relates generally to the field of data conversion and storage methods and apparatus and, more particularly, to a method and apparatus for rapidly converting fixed field input data to a compact, useful and, user-friendly database format recorded on a compact disk.

Commonly, business records such as invoices, statements and reports are recorded on paper. Thus, following ordinary business practices generates reams of paper invoices, statements and reports. Traditionally, such papers have been converted to microfiche. Businesses that desire to convert these records to microfiche have transferred the data to a machine readable format and stored it on 9-track magnetic tape. The data stored on the 9-track tape is then used to create microfiche representative of the data stored on the tape. Many times, the data is transferred in a full-text format directly from invoices and reports to computer, stored on to computer tape, and is then transferred to microfiche. Due to the full-text method of transfer, an invoice three pages in length will be represented on microfiche as three consecutive pages of the same invoice. Such microfiche records tend to be inconvenient to use and to search, due to the single-index limitation and the sheet-like nature, both of which are characteristic of microfiche.

More recently, data contained on 9-track tapes, formerly used to produce microfiche, has been stored on optical and compact discs. Compact discs have many advantages over optical disks, including the use of a standard ISO 9660 protocol recording format which renders compact discs uniformly readable by all standard compact disc players. As such, people have been turning to compact disc for data storage. One disadvantage to past compact disc mastering systems is that processing and recording of the data onto compact disc, like microfiche transfer, has been accomplished using full-text data transfer. As such, all text contained in any given report or invoice has been directly transferred to a database and then onto the compact disc. This results in the storage of unnecessary, duplicative data on the compact disc. For example, if a client report was originally multiple pages in length, the customer data transferred to CD would include all of the information on each page of the report. Often, a single invoice having multiple pages will duplicate information, such as the client address and shipping address, on each page of the report. Full-text transfer system directly copy each record of the entire report into the database files without discriminating between and deleting those records that are duplicative. The retention of this information in past compact disc mastering systems is in keeping with the idea that each page of data will be presented to the end user exactly as originally presented on paper. Thus, a three page invoice will be presented to a user as three consecutive document pages. No past compact disc mastering system removes the duplicative data before writing to the compact disk. Nor does any past system replicate a three page invoice or report as a compact single page report, only displaying the duplicated data once while making the unique data accessible to a user.

Another drawback of a direct full-text data transfer method, is that such systems create databases wherein either the data is not stored distinctly enough to permit effective multiple field index searches, or compactly enough to provide rapid, effective multiple field searches without consuming a substantial portion of the space available on the compact disc. If a user desired to conduct a search for a specific check number, in a first kind of system, the retrieval program would search through all lines of each report for any occurrence of the specified character string or number. In such a system, each report line is stored as a single field and there is no further breakdown supplied to the retrieval software to determine the locations of true fields occurring in the report. As such, such a system would be incapable of distinguishing whether a number specified to be searched was a check number or part of an address, zip code or telephone number. It can only search each line of the entire database until the requested number was found.

Alternately, in a second kind of system, in order to permit the user to conduct multiple index searches, an index must be created for each combination of searchable data in order to permit a multiple index query. For example, if it is desired that a certain check number or a certain client number be searched, these past systems would require one separate index for all check numbers and one index for all client numbers. If a user wanted to search for a certain check number cross-referenced to a certain client, these systems would require the creation of an additional index containing all check numbers linked to the related client number for all clients. Thus, three indexes would be created to execute a search including two types of field data.

As such, there is a need for a compact disk data storage system having a means for creating an index that can allow multiple index queries to be performed, without being too space consuming or tedious to use. Further, there is a need for a compact disk data storage system that effectuates the compact storage of necessary data while discarding undesired duplicative data while storing the data to the compact disc in a user-friendly single page format.

SUMMARY OF THE INVENTION

Briefly describing one aspect of the present invention, a system and method for rapidly storing data to a compact disc in database form is provided which generates databases, applications and indices in accordance with commands from a script file descriptive of the format of the input data.

Another aspect of the present invention is to provide a system and method for rapidly storing data to a compact disc in database form, wherein databases, application programs and indices are generated in response to commands from a script file descriptive of the format of the input data and wherein said application programs are designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen.

A further aspect of the present invention is to provide a system and method for rapidly storing data to a compact disc in database form wherein databases, application programs and indices are generated in response to commands from a script file descriptive of the format of the input data wherein said application programs are designed to search in fixed fields for desired information in response to a search query.

A further aspect of the present invention is to provide a system and method for rapidly storing data to a compact disc in database form wherein databases, application programs and indices are generated in response to commands from a script file descriptive of the format of the input data wherein said application programs are designed to access multiple indices in response to a multiple field search query.

Further objects and advantages of the present invention may be discerned by persons of ordinary skill in the art after reviewing the following written description and accompanying figures.

BRIEF DESCRIPTION OF THE DRAWINGS

FIG.7 is a representation of a scrollable "hit list" screen listing records having a report type of "invoice" generated by the retrieval program in response to the "invoice" query made in FIG. 6.

FIG.8 is a representation of a scrollable "report page" data screen obtained by selecting the first invoice displayed in the invoice listing of FIG. 7.

DESCRIPTION OF THE PREFERRED EMBODIMENT

Figure 1:
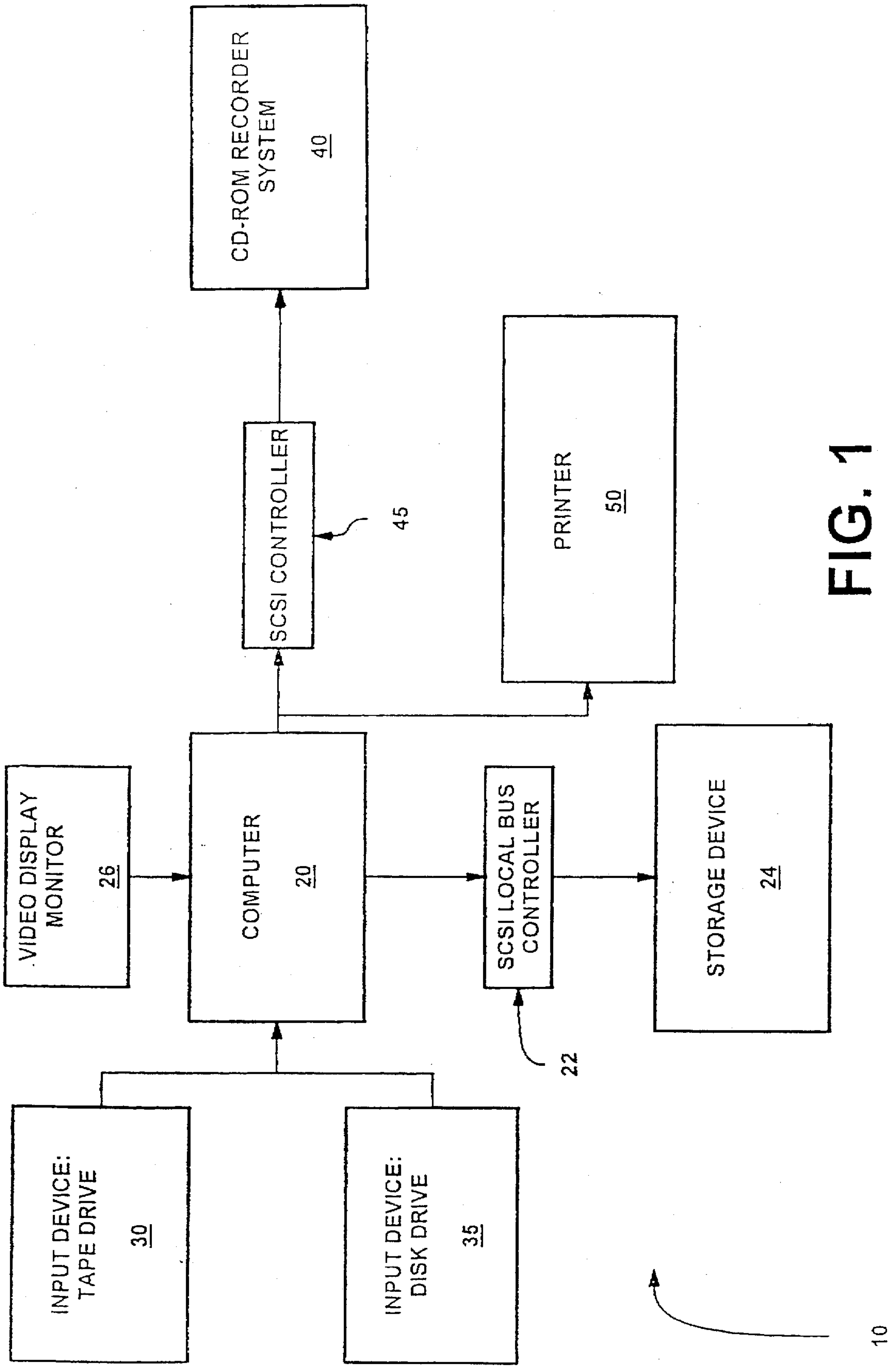
FIG. 1 is a block diagram of the compact disc mastering system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A method and apparatus for rapidly converting fixed field data input from either a magnetic medium or a scanning device to a desired database format stored on a compact disc is provided. FIG. 1 is a block diagram of a compact disc mastering system 10 of a preferred embodiment of the present invention. The compact disc mastering system 10 comprises a host computer 20 including an SCSI local bus controller 22 which interfaces the computer 20 to a storage device 24. All processing of input data is conducted in the host computer 20 and the resultant files are temporarily stored in the storage device 24. Data is input to computer 20 from the input devices 30 and 35. A CD-ROM recorder system 40 connected to computer 20 via a second SCSI controller 45 is used to write processed data to a compact disc in a desired database format. A hard copy representation of the processed data may also be created on printer 50. In the preferred embodiment of the present invention computer 20 is a standard IBM compatible computer having a 80486 microprocessor and including 8 megabytes of random access memory (RAM). Additionally, a VGA graphics monitor 26 is connected to computer 20 via an adapter. Storage device 24 may be any hard disk drive having sufficient memory capabilities, such as the MAXTOR 1.7 Gigabyte hard disk drive, and may be connected to computer 20 via an SCSI controller 22, such as the ULTRA STORE 34F local bus SCSI controller. Tape drive 30 may be a cartridge tape drive, such as the OVERLAND DATA INC. 3480 cartridge tape drive, or can also be a 9-track tape drive, such as is the OVERLAND DATA INC. 1600/6250 9-track tape drive. Any number of standard floppy disk drives 35 can be used with the system of the present invention. Further, input may be supplied to computer 20 using a computerized scanner (not shown). Basically, any input device that provides computer 20 with machine readable data may be used with the present system.

In the preferred embodiment of the present invention, data is written to a compact disc in the standard ISO 9660 protocol developed for compact discs using a CD recorder, such as the PHILLIPS CCD 521 CD recorder. Such a CD recorder would be connected to computer 20 by an SCSI controller 45, which can be an ADAPTEC SCSI controller. The physical operation of the CD recorder may be controlled by mastering software run on computer 20, such as the CD-GEN mastering software. Further, printer 50, shown in FIG. 1, can be any printer suitable for the output of data. In the preferred embodiment, however, printer 50 is a HEWLETT-PACKARD LaserJet III printer. Additionally, input data is converted to a database form useful to the final consumer using a CD-ROM Application Development System (CADS) program run on computer 20, a copy of which is included as a microfiche appendix to the present application program.

Figure 2:
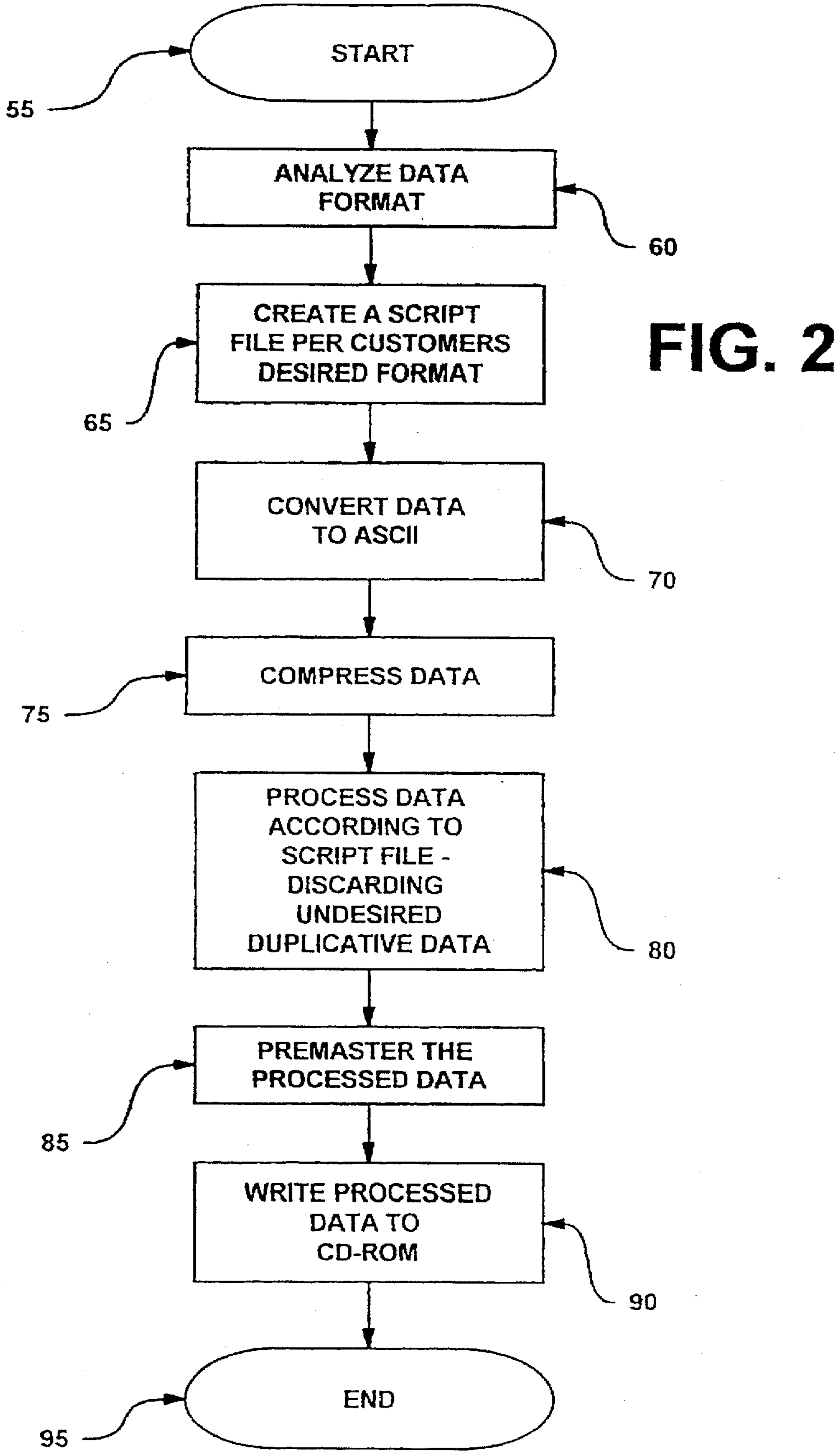
FIG. 2 is a flow diagram of the logic followed by the compact disc mastering system of the present invention.

Referring now to FIG. 2, the operation of the CADS program will be discussed in connection with the CD mastering system 10 of FIG. 1. FIG. 2 is a flow diagram generally depicting the operation of the compact disc mastering system of the present invention. Initially, data is provided to computer 20 in an EBCDIC format from either input device 30 or 35. The format of the data is analyzed by a computer operator in order to determine the format of the input data, step 60. It is important to determine the format of the input data in order to program a script file that will control the recreation of the data in a form desired by the final user of the data. If all of the input data has the same input format, each subsequent process of the input data will use the same script file. The CADS program of the present invention has been designed to generate applications and databases regardless of their input formats (invoice, reports, flat file). It is the CADS program that executes and controls the entire process, from reading script files and input files, to generating the databases and retrieval applications. The CADS program was designed to utilize a 'Script-file' concept wherein script commands are defined dynamically to match input data formats. The script commands are plain English-like statements understood by the CADS program which describe the input formats of the data. The script commands are used by the CADS program to process the input files and to generate the associated indices that allow rapid, effective searching of the databases. Each script language command contains various attribute identifiers to further define the input data stream, it's fields and characteristics. For example, an input data script file may define the field offset, lines, columns, length and attributes of the input data. An application script file may define the descriptions, attributes and functionality of the application to be generated by the CADS program. Each input format supplied by a user and processed by the CADS program will require a custom tailored script file descriptive of the input format. As such, it is not necessary to reprogram the CADS program software for every different type of input data format, only the script file must be modified. This results in a great deal of time saved when multiple types of data formats are to be processed.

Figure 5:
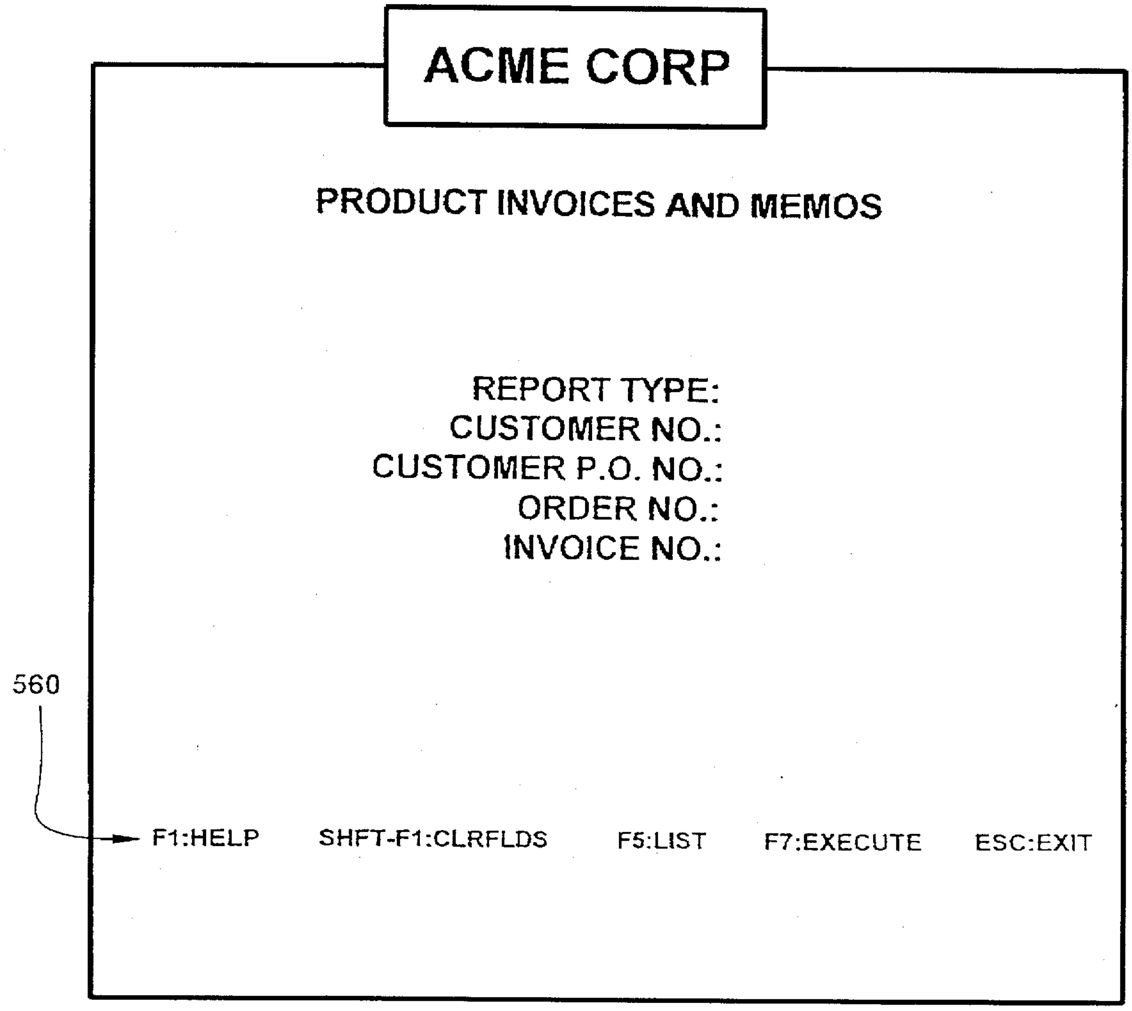
FIG.5 is a representation of an application screen, the present screen being representative of a query screen presented to a user who selected the product invoices and memos application from among the options on the main menu screen of FIG. 4.

FIG. 8 is a representation of a video display of an invoice the type of which can be found in a batch of customer input data. It can be seen in FIG. 8 that certain fields have certain line and column designations. For example, it can be seen from FIG. 8 that lines 2–5, columns 16–28, contain the purchaser address; lines 2–5, columns 54–68, contain the "ship to" address; line 11, columns 1 . 10 contain the customer number; etc. Script files can be written that are descriptive of these various attributes for use by the applications and databases to be written to the compact disc. For example:

To describe the application shown in FIG. 5 the following script command would be generated:

APPLICATION-DESC "PRODUCT INVOICES AND MEMOS"

To describe the location of the column headers for the the column header line of the report of FIG. 7, assuming that that line is line 7 of the report, then the following script command would be generated:

COL-HEADER-LINES 7

Similarly, to describe the starting column of the input file:

DATA-START-COLUMN 2

Further, to describe an index key used to create an index to aid in searching for a vendor number which is always located on line 4, column number 75 of the report, and, wherein the length of the virtual field containing the vendor number is defined to be 12 columns in length, each column being a single character, as opposed to a number, the following script command would be generated:

```
DB-KEY1   LINE:4   COLUMN:75
          LENGTH:12;
          TYPE:CHAR          FLDNAME:VENDOR  ;
          PROMPT:"Vendor #"  LEVEL:PAGE
```

Thus, after analyzing the data supplied to the system, a computer operator can create a script file used to define the output data format based on the format of the input data, step 70 of FIG. 2.

After the script file is created, the input data is stripped and converted from the standard EBCDIC to ASCII files which are stored in the hard drive 24 of computer 20, step 70. During the database generation process, index points are inserted into the data in accordance with commands from the script file. After the data has been stripped and converted to ASCII, the data may optionally be compressed using conventional data compression techniques, step 75. A known data compression algorithm has been incorporated into the CADS program of the present invention to accomplish this data compression. For example, data compression may be accomplished data using a data compression software library generally available from PKWARE, Inc. This compression feature built into the CADS program can increase the storage on the compact disc as much as 5 times more than uncompressed data, thus allowing for the storage of approximately 600,000 pages of high-density reports on a single compact disc.

Applications, databases and indices will then be created by the CADS program in accordance with script commands from the script file. The input data will then be processed and will be written into the compressed or uncompressed databases and indices created, while undesired, duplicative data is discarded, step 80. FIGS. **3*a* and 3*b* show flow diagrams detailing the steps followed during step 80 of FIG. 2** for the process the data and for creating retrieval applications, databases and indices.

Figure 3A:
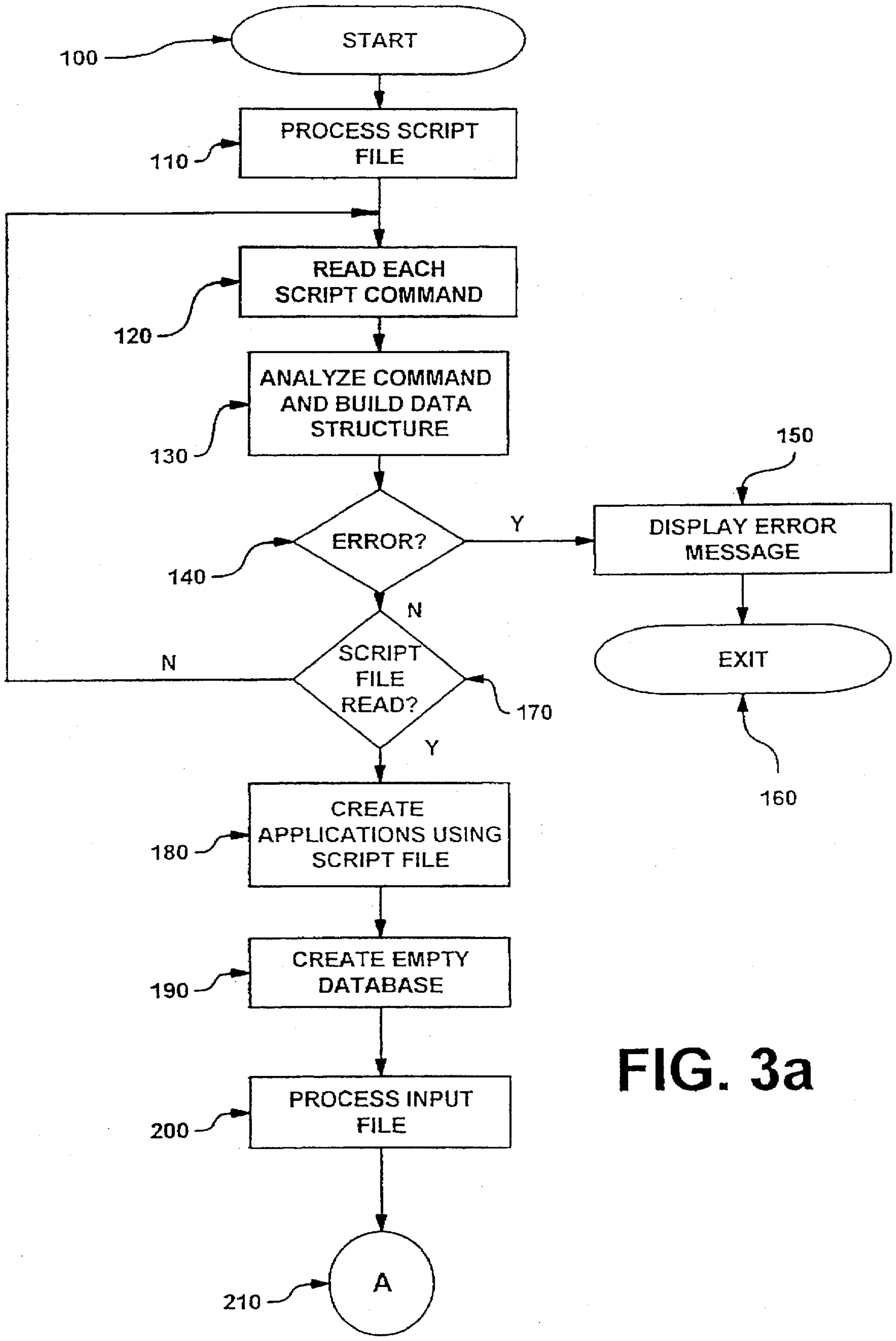
FIGS. 3*a* and 3*b* are flow diagrams further describing the logic followed by the compact disc mastering system of the present invention when processing input data.

Referring now to FIGS. **3*a* and 3*b*, there is shown a flow diagram detailing the operation of the CADS program when processing the data in accordance with the script file to obtain the desired output format. First, the script file created by a computer operator is stored on the hard drive 24 of computer 20. The CADS program is executed to process the generated script file and the input file. The script file is opened and processed by the CADS program in step 110 of FIG. 3*a*. Then each script command is read and analyzed by the CADS program, step 120. Depending upon the various types of script commands specified, the CADS program will build the appropriate working tables and data structures to be referenced during processing of the input file, step 130**. The script commands will describe the applications to be generated, its headers, footers, and run characteristics including the index key and print attributes.

If an error is detected during the script file processing, step 140, the appropriate error message will be displayed, on the video display 26 of FIG. 1, step 150, and operation of the CADS program will be terminated, step 160. Otherwise, operation of the CADS program will continue reading and processing the entire script file until all script commands have been processed, step 170. Once all script commands have been read from the script file and processed, the CADS program will create the required run-time programs and applications, step 180. Information to create these programs will be provided by the data structures built during step 130 of the script file processing.

The applications generated in step 180, based on instructions from the script file, will be generated to be compatible with the FOXPRO 2.0 database format, created by MICROSOFT, Inc. All databases and indices created will be in this FOXPRO format. However, the choice of FOXPRO over another database structure is not meant to limit the scope of the present invention. The present system could also be implemented using a DBASE IV type database structure or any other standard database format. The CADS program of the present invention will generate a FOXPRO compatible retrieval program to access the databases and indices created, also in step 180. This retrieval program provides a user-friendly interface to allow users to retrieve information quickly and easily. The retrieval program is designed to preserve the look and feel of an actual "report page" with which the user is familiar. The retrieval and application programs generated by the CADS program in step 180 operate to retrieve data in a format representative of exactly what the user would see on a printed report page. The user is able to browse through these pages using keys on the keyboard of a computer. The retrieval and applications programs generated by the CADS program and stored on the compact disc using the PHILLIPS CD recorder, will be discussed below in greater detail in connection with FIGS. 4–9.

After the applications have been created, the CADS program will create all of the empty database files and all of the structural indices to which data will be written, step 190. Like the applications, the empty databases are created based on instructions from the script file in a FOXPRO 2.0 compatible format and contain all applicable attributes for the generated application. One database containing many related files is created for each unique application.

Additionally, the database accessing indices are generated according to commands from the script file. Utilizing a single-entry index design (one index key for each type of virtual field to be indexed, as will be described below), the indices are created making use of the FOXPRO 2.0 compound index feature. Indices created in this way are more compact then other types of indices and still retain the quick access speed during multi-field queries using FOXPRO's Rush-more searching technology.

Figure 3B:
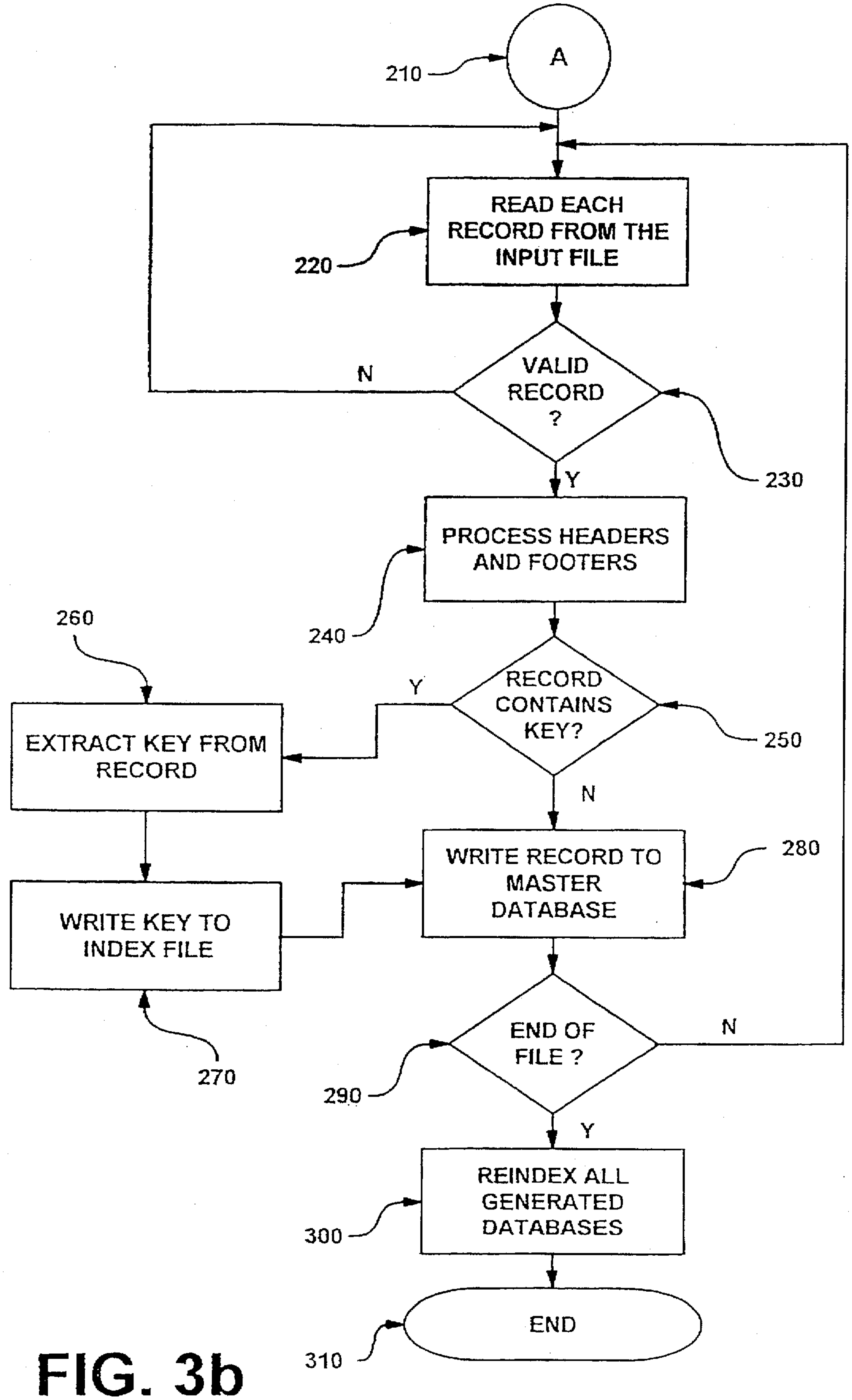

Once the empty databases and indices have been created, it is possible to begin processing the ASCII input files, step 200. Referring now to FIG. 3*b*, data is first processed by reading each record from the ASCII file, step 220. The input record is then analyzed using information from the data structures built earlier during script file processing. If the input record is not a valid record, which is determined from script file specifications, (i.e. contains undesired duplicative data or makes no sense in view of the script commands), that record is rejected and the next record is read from the input file, step 230. In this way unnecessary duplicative data can be removed from the input data. If the input record is a valid record, then a record processing subroutine will be called upon to process the record. The record processing subroutine, again based on script commands in the script file, will attempt to extract headers, footers and page numbers from the input record, step 240.

The input record is additionally checked to see if it contains an index key or keys, step 250. If the record does contain a key or keys, the key is extracted from the input record, step 260, and written to the appropriate index file, step 270. The record is then written to the master database, step 280. Data can be written to the master database in either a compressed or uncompressed form, at the option of the computer operator. If the input record is not compressed, an entire line of data from a report is written straight into the database as a single fixed field. Thus, each fixed field may possibly contain therein multiple virtual fields, the locations of which are programmed as commands in the script file. The indices that are created permit a search of these virtual fields rather than through the full text of the record. If the ASCII file supplying the data has been compressed using the PKWARE compression library, then an entire compressed page of data will be stored as a single field in a FOXPRO format called a memo field. The memo field used in FOXPRO allows for the storage of fields that are greater than 255 characters in length. Thus, an entire compressed page of data can be stored as a single memo field in the generated database. The databases can be created directly from the input data, eliminating the need for temporary working storage.

After the processed data has been written to the master database, the next record is retrieved from the input device and the process is repeated until all data has been read from the input file, step 290. The processed data is stored in the hard drive 24 of computer 20. When the entire input file has been processed, spot checks are performed to verify the input file against the generated databases.

After the data has been verified, all generated databases are reindexed into a master index, step 300. Once the indexing has been completed, the data processing stage of the program is complete and the processing portion of the CADS program terminates, step 310.

Referring back to FIG. 2, processed data is then further processed by premastering software in order to put the data in to a file structure recognizable on the compact disk, step 90. This premastered data is then written to a compact disc using the PHILLIPS CD recorder system (40 of FIG. 1). Thus, a compact disc is created containing FOXPRO 2.0 type databases, retrieval and applications programs, and indices.

The retrieval and applications programs generated by the CADS program will now be described in connection with FIGS. 4–9. The programs created by the CADS program of the present invention, and stored on the compact disc, may be run on a computer having a VGA monitor, such as computer 20. It is desirable that the retrieval computer have a large amount of random access memory on the data retrieval computer, such as the 8 megabytes of RAM contained on the computer 20 of the compact disc mastering system 10, as the extra extended memory is used to speed up query searches of large databases. It is additionally believed that the present retrieval system could be implemented utilizing IBM AS/400 connectivity, IBM 3090 connectivity and Unix connectivity. For example, using 5251 emulation and a direct twinax connection, a PC-based CD-ROM server can be attached to an AS/400 terminal. Additionally, using 3090 emulation and direct connection, a PC-based CD-ROM server can be attached to a 3090 system and provide access to the data from any 3090 terminal. Further, using the TCP/IP protocol to connect a PC-based CD-ROM server to allow Unix workstations to access the CD-ROM data.

Figure 4:
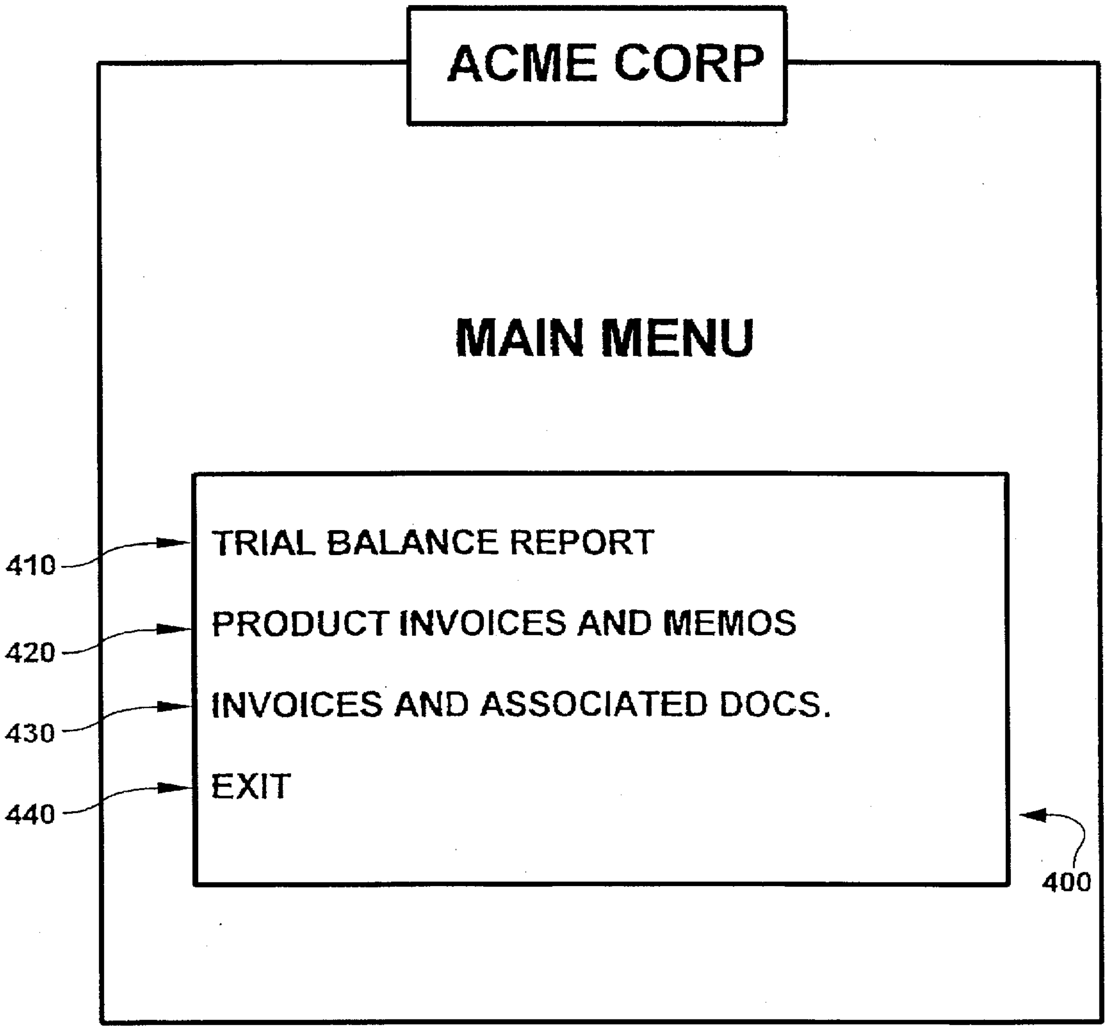
FIG.4 is a representation of the main menu showing a listing of 3 different applications created by the retrieval software generated by the compact disc application development system program of the present invention.

FIG. 4 is a representation of the main menu screen, seen on the VGA monitor of the retrieval system, as is generated by the retrieval software created by the CADS program of the present invention. The main menu screen offers a user the option of viewing three different applications, shown in main menu box 400. An application is a program used to access the data stored in the database created by the CADS program and written to the compact disc. For example, selection of the "Product Invoices and Memos" application 420 will allow a user to access the data stored in the "Product Invoices and Memos" database. Likewise, selection of the "Trial Balance Report" application 410 or the "Invoices and Associated Documents" application 430 will allow the user to access those databases, each generated by the CADS program in accordance with a different script file. Choosing the "Exit" option 440 will cause a user to exit the retrieval program.

Figure 6:
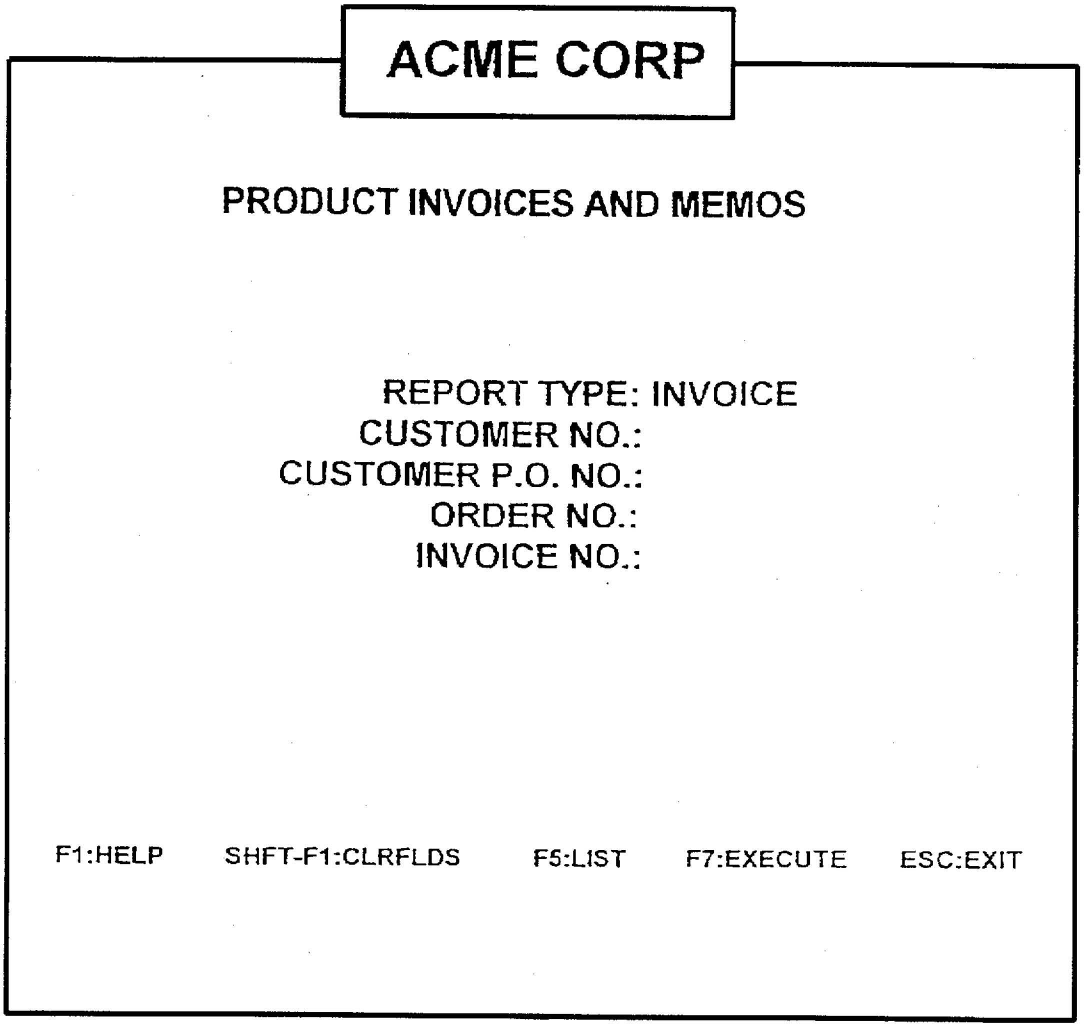
FIG.6 is a second representation of the query screen of FIG. 5 wherein a user has selected "invoice" using a computer keyboard in response to a query on the query screen.
Figure 9:
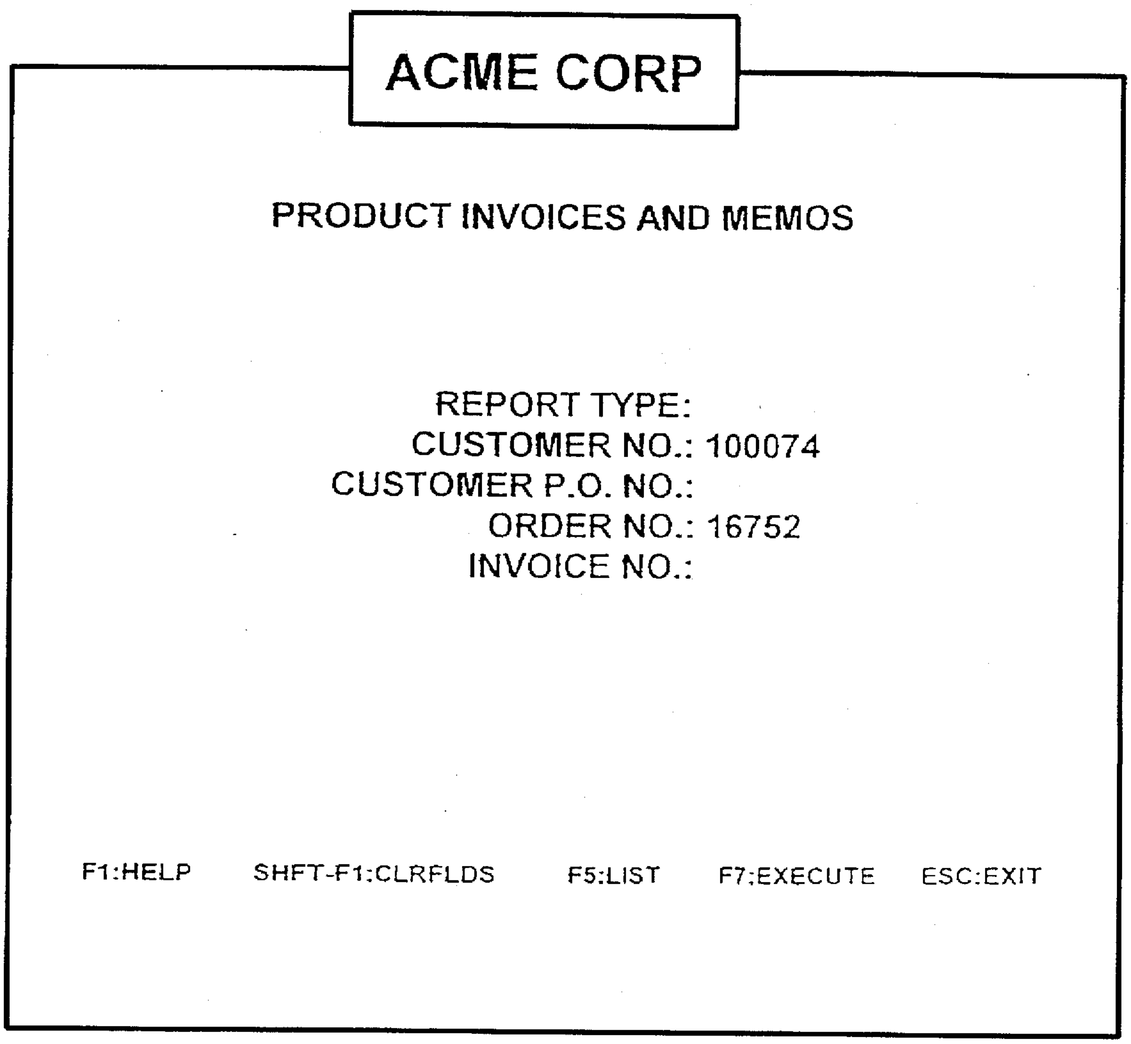
FIG.9 is a representation of the query screen of FIG. 5 showing the user selection of a multiple field search query.

FIG. 5 is a representation of the application screen for the "Product Invoices and Memos" application, which is generated by the selection of the "Product Invoices and Memos" application option 420 of FIG. 4. In the application, a user is presented with a query screen, such as is shown in FIGS. 5, 6 and 9. Using the keyboard, values are entered according to what information a user would like displayed. For example, among the options searchable in this particular application are Report Type, Customer No., Customer Purchase Order Number, Order No., Invoice No. or any combination(s) of the above options. Any given application allows a user to search through those fixed fields, or virtual fields, in which index keys were designated in the script file, and for which resultant indices were created. During execution of the CADS program one index was generated for each individual fixed field that can be searched. For example, for the database searchable by the query screen of FIG. 5, only five compound indices were created, one index each for report type, customer no., et cetera. Option line 560 directs the user to different function keys on the computer keyboard that can be used to execute different functions available in the application. For example, pressing the F7 key on the keyboard will cause a search request to be executed.

FIG. 9 shows a query screen wherein a user has entered a multiple field search query in order to locate order no. 16752 of customer no. 100074. This multiple field search is conducted through the indices related to this application and this database. The indices generated by the CADS program in steps 250 and 260 of FIG. 3*b* are generated based on instructions from the script file. In the present system a single-entry index is created for indexing each field. These indices are also assigned a level-id according to whether the field can occur once per page or once per line of the record, based on the key description programmed into the script file. With all indices open for access, the program will attempt to locate the matching pages and detail lines of a report or invoice starting from the record-level, and then the page-level indices. This method is index-independent and will work for whatever search criteria is requested by the user in the query, regardless of the orders or combinations of the searched fields. For example, in the multiple field search query shown in FIG. 9, ordinarily both the customer no. and the order no. would appear once per page of report. As such, the level-id defined in the script file would be "page". Additionally, the index key, as programmed in the script file, would detail the report line and column number where the customer no. or order no. fixed field would occur. As such, the retrieval software need only look for matching data in those lines and columns defined in the script file as being associated with the desired fixed field data. This causes the indices to be greatly compact, thus saving on compact disc space.

FIG. 6 shows the query screen of FIG. 5 wherein a user has requested a display of all "Invoice" type reports in the present database. This request will generate a "Hit List" of all records having an "Invoice" report type. Other report types could be Memos, Credit memos, et cetera. FIG. 7 shows the "Hit List" application screen generated by the execution of the search request shown in FIG. 6. The "Hit List" application screen of FIG. 7 shows all available invoices and related index key information (searchable on the query screen) for reports that are defined as invoices. The scroll arrows 530, shown at the bottom of the "hit list" screen, indicate to a user that more entries are available and can be viewed by scrolling through the information lines, called detail lines, displayed in box 520. A user can scroll through the entries line by line using the up and down arrow keys on the keyboard or may additionally move through the hit list using the page up or page down keys on the keyboard. Selection of one of the detail lines will result in the display of the report associated with that detail line. For example, selection of the detail line shown at the top of box 520, that of customer number 102505-0004, will result in the display of the related report, as shown in FIG. 8.

FIG. 8 is representative of a report selected from those shown in FIG. 7. The resulting CADS program generated databases retain the look and feel of an actual report, as was supplied in the input data. All characteristics of a given report (i.e. standard 80/132 column reports, invoice, statement or purchase order) such as subtotals, totals, blank lines will all be preserved and retrieved just as one would see if they flipped through the pages of the report. Moreover, the CADS program takes advantage of the extended VGA display mode to generate applications that can be displayed in 132 columns and 43/60 lines, in addition to a standard 80 column/25 line display. The 132 column mode allows for the exact replication of the original input data, with the addition of option line 630, as shown in FIG. 8. An additional feature of the retrieval program generated by the CADS program is that the retrieval software presents all invoices (or statements, or purchase orders, etc.) in the form of a single page, regardless of the number of pages contained in the original report. As described above, the unnecessary duplicative data contained in a multiple page invoice was discarded during the data processing stage (80 of FIG. 2) of the CADS program operation. As such, necessary information such as is shown in lines 600 of FIG. 8 are fixed for that report, as only one set of that data was saved per multiple page invoice. However, multiple page invoices include multiple pages of unique information or detail lines, lines 610, that continue from one page of the report onto another page of the report. Instead of having to page down to the second page of a multiple page invoice, a user may instead scroll through the detail lines 610, as is indicated by the scrollable arrows 620. Thus, the customer address and invoice information, only stored once per invoice in the database, is fixed on the screen, while the detail lines of the invoice are scrollable, individually by using the up and down arrows, or in blocks by using the page up or page down keys on the computer keyboard. Thus the entire invoice is represented as a single screen page having scrollable detail lines, regardless of the number of physical pages that were originally printed in the original invoice. To view a different report, options can be selected from among those offered on the option line 630. As such, the retrieval software generated by the CADS program provides an exact replica of the invoice/statement/purchase order forms represented by the input data.

Additionally, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of storing data to a compact disc in database form, comprising the steps of:

analyzing the input data to determine the format of said input data;

generating a script file descriptive of the format of said data;

storing said script file in a computer containing a compact disc application development system program capable of processing said data in accordance with commands from said script file;

processing said script file with said compact disc application development system program on said computer to create application programs and empty indices and empty databases;

storing said application programs and created indices and databases to a storage device connected to said computer;

writing said input data to said created databases and created indices stored on said storage device;

premastering said applications programs, said written-to indices and said written-to databases using a premastering program executed by said computer to convert said generated applications programs, said generated indices and said generated databases into a predetermined format; and writing said premastered applications, said premastered indices and said premastered databases to a compact disc.

2. The method of storing data to a compact disc of claim 1, additionally comprising the steps of:

storing said input data from an input device to a storage device connected to said computer; and processing said input data in accordance with said script file to remove undesired duplicative data.

3. The method of storing data to a compact disc of claim 1, additionally comprising the step of:

compressing said data using a data compression program executed by said computer prior to writing said data to said empty indices and to said empty databases.

4. A method of storing data to a compact disc in database form, comprising the steps of:

analyzing the input data to determine the format of said input data;

generating a script file descriptive of the format of said data;

storing said script file in a storage device connected to a computer, said computer including a compact disc application development system program capable of processing said data in accordance with commands from said script file;

storing said input data from an input device to said storage device;

generating empty databases and empty indices on said computer in accordance with commands from said script file;

generating applications on said computer in accordance with information contained in said script file, said applications being designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen;

writing said input data to said generated databases and generated indices;

premastering said applications programs, said written to indices and said written to databases using a premastering program executed by said computer to convert said applications programs, said written to indices and said written to databases into a predetermined format; and writing said premastered applications, said premastered indices and said premastered databases, to a compact disc.

5. The method of storing data to a compact disc of claim 4, wherein said application programs are designed to search fixed-field data in response to a search query.

6. The method of storing data to a compact disc of claim 4, wherein said application programs are additionally designed to access multiple indices is response to a multiple field search query.

7. The method of storing data to a compact disc of claim 4, additionally comprising the steps of:

converting said input data from an EBCDIC format to ASCII;

separating relevant input data from irrelevant input data which was included in said input data when said input data was stored to said input device in said EBCDIC format;

discarding said irrelevant input data; and inserting index points into said stripped and converted data.

8. The method of storing input data to a compact disc of claim 4, additionally comprising the step of:

compressing said data using a data compression program executed by said computer prior to writing said data to said indices and to said databases.

9. The method of storing input data to a compact disc of claim 4, additionally comprising the step of:

processing said input data to remove undesired duplicative data in accordance with commands from said script file.

10. A method of storing data to a compact disc in database form, comprising the steps of:

analyzing the input data to determine the format of said input data;

generating a script file, wherein said script file is descriptive of the format of said input data;

storing said script file onto a hard disc drive connected to a computer, said computer containing a compact disc application development system program capable of processing said input data in accordance with commands from said script file;

loading said input data from a 9-track tape drive to said computer; converting said input data to an ASCII format using said computer; inserting index points into said converted data;

storing said converted ASCII data in the form of at least one ASCII file on said hard drive of said computer;

generating applications programs using said computer in accordance with commands from said script file, said application programs being designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen;

generating empty databases and empty indices on said computer in accordance with commands from said script file;

storing said applications programs, said generated indices and said generated databases to said hard drive of said computer;

processing said ASCII data to remove undesired duplicative data in accordance with commands from said script file;

writing said processed data to said generated databases and said generated indices;

premastering said applications programs, said written-to indices and said written-to databases using a premastering program executed by said computer to convert said applications programs, said written-to indices and said written-to databases to a predetermined format; and writing said premastered applications, said premastered indices and said premastered databases, to a compact disc.

11. The method of storing data to a compact disc of claim 10, additionally comprising the step of:

compressing said data using a data compression program executed by said computer prior to writing said data to said indices and to said databases.

12. A system for storing data to compact disc in database form, comprising:

a computer for processing the input data in accordance with a script file descriptive of the format of said input data, said computer including storage means for storing processed and unprocessed data, processing means for processing data and memory means;

an input device connected to said computer for providing input data to be processed to said computer;

a compact disc applications development system program, stored in said memory of said computer, for generating applications programs, empty databases and empty indices in accordance with commands from said script file, for directing the processing of said input data in accordance with commands from said script file, and for writing said processed data to said generated databases and generated indices;

premastering means, stored in said memory of said computer, for converting said applications programs, said written-to databases and said written-to indices to a predetermined format; and compact disc recorder means, connected to said computer, for storing said premastered applications programs, said premastered databases and said premastered indices to a compact disc.

13. The system for storing data to a compact disc of claim 12, additionally comprising compression means contained in said memory of said computer for compressing said processed data before said processed data is written to said databases and said indices.

14. The system for storing data to a compact disc of claim 12, wherein said input device is a 9-track tape drive.

15. The system for storing data to a compact disc of claim 12, wherein said application programs generated by said compact disc applications development system program are designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen.

16. The system for storing data to a compact disc of claim 12, wherein said application programs are designed to search fixed field data in response to a search query.

17. The system for storing data to a compact disc of claim 16, wherein said application programs are additionally designed to access multiple indices in response to a multiple field search query.

18. A system for storing data to compact disc in database form, comprising:

means for generating a script file descriptive of the format of input data;

a computer for processing the input data in accordance with said script file, said computer including a hard disk drive, a microprocessor and memory;

a 9-track tape drive connected to said computer for providing input data to be processed to said computer;

conversion means contained in said memory for converting said input data into an ASCII format if said data is not already in ASCII;

a compact disc applications development system program, stored in said memory of said computer, for generating applications programs, empty databases and empty indices in accordance with commands from said script file, for processing said converted data to discard undesired repetitive data from said converted input data in accordance with commands from said script file, and for writing said processed data to said empty databases and indices;

premastering means, stored in said memory of said computer, for converting said applications programs, said written-to databases and said written-to indices to a predetermined format; and compact disc recorder means, connected to said computer, for storing said premastered applications programs, said premastered databases and said premastered indices to a compact disc.

19. The system for storing data to a compact disc of claim 18, wherein said application programs generated by said compact disc applications development system program are designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen and wherein said application programs are additionally designed to access multiple indices in response to a multiple field search query and wherein said application programs are additionally designed to search fixed field data in response to a search query.

20. The system for storing data to a compact disc of claim 19, additionally comprising compression means contained in said memory of said computer for compressing said processed data before said processed data is written to said databases and said indices.

21. A system for storing data to compact disc in database form, comprising:

a computer for processing input data in accordance with a script file descriptive of the format of said input data, said computer including storage means for storing processed and unprocessed data, processing means for processing data and memory means;

a compact disc applications development system program, stored in said memory of said computer, for generating applications programs, empty databases and empty indices in accordance with commands from said script file program, for directing the processing of said input data in accordance with commands from said script file, and for writing said processed data to said generated databases and generated indices;

premastering means, stored in said memory of said computer, for converting said applications programs, said written-to databases and said written-to indices to a format recognizable on said compact disc; and compact disc recorder means, connected to said computer, for storing said premastered applications programs, said premastered databases and said premastered indices to a compact disc.

22. The system for storing data to a compact disc of claim 21, additionally comprising compression means contained in said memory of said computer for compressing said processed data before said processed data is written to said databases and said indices.

23. The system for storing data to a compact disc of claim 21, wherein said application programs generated by said compact disc applications development system program are designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen.

24. The system for storing data to a compact disc of claim 21, wherein said application programs are designed to search fixed field data in response to a search query.

25. A system for storing data to compact disc in database form, comprising:

means for generating a script file descriptive of the format of input data;

a computer for processing the input data in accordance with said script file, said computer including a hard disk drive, a microprocessor and memory;

conversion means contained in said memory for converting said input data into an ASCII format if said data is not already in ASCII;

a compact disc applications development system program, stored in said memory of said computer, for generating applications programs, empty databases and empty indices in accordance with commands from said script file program, for processing said converted data to discard undesired repetitive data from said converted input data in accordance with commands form said script file, and for writing said processed data to said empty databases and indices;

premastering means, stored in said memory of said computer, for converting said applications programs, said written to databases and said written to indices to a format recognizable on said compact disc; and compact disc recorder means, connected to said computer, for storing said premastered applications programs, said premastered databases and said premastered indices to a compact disc.

26. The system for storing data to a compact disc of claim 25, wherein said application programs generated by said compact disc applications development system program are designed to retrieve data in a single page-screen format, wherein fixed data common to all pages of a multiple page report is fixed on a first portion of said single page screen and wherein detail data unique to each page of a multiple page report may be displayed by scrolling through said detail data on a second portion of said single page screen and wherein said application programs are additionally designed to access multiple indices in response to a multiple field search query and wherein said application programs are additionally designed to search fixed field data in response to a search query.

* * * * *

UNITED STATES PATENT AND TRADEMARK OFFICE
CERTIFICATE OF CORRECTION

PATENT NO. : 5,675,780
DATED : October 7, 1997
INVENTOR(S) : Plant-Mason et al.

It is certified that error appears in the above-identified patent and that said Letters Patent is hereby corrected as shown below:

In column 5, line 27, please change "1.10" to --1-10--.
In column 6, line 9, please delete "data", first occurrence.
In column 12, line 3, please change "is" to --in--.
In column 13, line 26, please insert --program-- after "file".
In column 14, line 10, please insert --program-- after "file".

Signed and Sealed this

Ninth Day of May, 2000

*Attest:*

Q. TODD DICKINSON

*Attesting Officer* *Director of Patents and Trademarks*

UNITED STATES PATENT AND TRADEMARK OFFICE
CERTIFICATE OF CORRECTION

PATENT NO : 5,675,780

DATED : October 7, 1997

INVENTOR(S) : Plant-Mason et al.

It is certified that error appears in the above-identified patent and that said Letters Patent is hereby corrected as shown below:

In column 1, line 59, please change "system" to --systems--.

Signed and Sealed this

Thirty-first Day of October, 2000

Attest:

Q. TODD DICKINSON

*Attesting Officer*

*Director of Patents and Trademarks*